United States Patent Office 2,871,092
Patented Jan. 27, 1959

2,871,092

NIOBIUM-TANTALUM SEPARATION

Harley A. Wilhelm, Ames, Iowa, and Raymond A. Foos, Kenmore, N. Y., assignors to the United States of America as represented by the Atomic Energy Commission No Drawing. Application August 15, 1955
Serial No. 528,569

5 Claims. (Cl. 23—23)

This invention deals with the separation of niobium and/or titanium values from tantalum values contained in an aqueous solution by solvent extraction.

Niobium and tantalum occur together in a great many ores, for instance, in the columbite-tantalite-type ores. These ores contain the niobium and tantalum in the form of their pentoxides mainly in association with ferrous oxide and manganous oxide. The formula of columbite-tantalite ore corresponds to [(Nb, Ta)O$_3$]$_2$ (Fe, Mn); it also contains small quantities of tin oxide, titanium oxide, aluminum oxide, and silica. Fergusonite is another ore containing both, niobium and tantalum; it has the formula Y(Nb, Ta)O$_4$. The residue obtained in processing blomstrandine also contains both niobium and tantalum values.

Tantalum has a great many uses in metallurgy and in particular as a component of alloys. It is mostly desirable to incorporate the tantalum in pure form, and for this reason it was necessary to devise a process by which the tantalum could be effectively separated from the niobium associated therewith. Niobium, being in the same group of the Periodic Table of Elements as tantalum, has very similar chemical properties, and for this reason the separation of the two elements has been found rather difficult.

One process has been developed which uses an aqueous hydrofluoric acid solution of the tantalum-niobium ore. In the preferred embodiment of that process free hydrofluoric acid is best present in a concentration of about 0.4 N, and this solution is extracted by contact with a substantially water-immiscible organic ester, alcohol, ketone or aldehyde containing at least 5 carbon atoms whereby the tantalum is taken up by an organic extract phase while the niobium remains in the aqueous solution. The process is described in copending application Serial No. 387,338, filed by Harley A. Wilhelm and James V. Kerrigan on October 20, 1953, and granted on October 16, 1956, as Patent No. 2,767,047. The process of this copending application has given very satisfactory results. However, it has the disadvantage that the free hydrofluoric acid in the aqueous solution causes quite some corrosion problems since glass as well as most metals react therewith.

It is an object of this invention to provide a process for the separation of tantalum and niobium values by selective solvent extraction from hydrofluoric acid-containing aqueous solutions by which the above described disadvantage is overcome.

More specifically it is an object of this invention to provide a process for the separation of tantalum and niobium values by selective solvent extraction from hydrofluoric acid-containing aqueous solutions which does not require the handling of highly corrosive solutions.

It has been found that by adding an amine to the aqueous hydrofluoric acid-containing solution prior to extraction, the corrosiveness is practically eliminated and satisfactory selective extraction is obtained from such an amine-containing solution. The quantity of the amine should be great enough to bring the pH to a value of at least 4 so that the corrosiveness of the solution is reduced to a minimum. On the other hand the extraction is better if the pH value is not higher than 6, as will be demonstrated later. For these reasons the pH range between 4 and 6 is considered optimal.

While aliphatic as well as aromatic amines are suitable for the process of this invention, aromatic amines are preferred because they yield a higher degree of separation. Alkanol amines were found to be among the best-operative amines; also aniline and aniline derivatives (hereinafter referred to generically as aniline), and here again the N-alkanol-substituted anilines, proved excellent. Mixtures of various solvents, for instance, of aniline with monoethanolamine gave also good results.

The amines per se do not function as selective extractants. A few of them at best accomplish a fair total extraction but no separation to speak of. For the purpose of selective extraction a solvent is then added to, or contacted with, the amine-containing aqueous solution.

A great many solvents were tested; a suitable selective solvent, it was found, had to have at least 4 carbon atoms in the molecule, and it had to be substantially water-immiscible; esters, aldehydes and ketones were found operative, the ketones yielding the very best results. Solvents that were successfully used are cyclohexanone, isophorone, mesityl oxide, methyl isobutyl ketone, methyl n-hexyl carbinol, tributyl phosphate, ethylacetoacetate, and water-immiscible amines other than those having a hydroxy group. For instance, branched primary amines that have a tertiary alkyl structure and a total carbon content of between 12 and 24 atoms per molecule were found satisfactory; m-toluidine proved also operative. The amines in some cases were preferably used in diluted form, and fuel oil, kerosene, turpentine, toluene, and heptane were found to be suitable diluents.

A great many tests were carried out using various combinations of amine and solvents. For these tests a columbite-tantalite ore was processed 65% by weight of which consisted of tantalum and niobium pentoxides and which also contained some iron, titanium, manganese, aluminum, silicon, and tin. For each test 10 grams of the finely ground ore were mixed with 8.0 grams of sodium hydroxide and 4.0 grams of sodium peroxide, and this mixture was then heated at 650° C. for 30 minutes. The mass was cooled and then leached with about 300 ml. of hot 1.0 M aqueous sodium hydroxide solution whereby the aluminum, tin, manganese, and silicon were dissolved. The insoluble residue was then separated and leached with about 200 ml. of a hot solution of 5.0 M nitric acid to which a trace of hydrogen peroxide had been added. By this treatment the iron and titanium were dissolved; the solution was removed by filtration. The residue which was practically pure niobium and tantalum pentoxides was then dissolved in about 5 ml. of concentrated hydrofluoric acid.

The hydrofluoric acid solution thus obtained, the "stock solution," contained the pentoxides in a weight ratio of 52Ta$_2$O$_5$:48Nb$_2$O$_5$. The total content in pentoxides amounted to 517 g./l. which corresponds to a molarity of about 1.45. The total acidity of the stock solution was 17.3 M while the F$^-$ concentration was 15.3 N. For the extraction tests summarized in the table below aqueous "initial solution," which had been obtained by diluting 22 ml. of the stock solution to 100 ml., was used except where indicated otherwise. One volume, usually 10 ml. of the initial solution, was contacted in each case, after the addition of the amine, with two volumes of the organic solvent or solvent mixture. The values given in the table as Ta/Nb separation factors represent the quotient of distribution coefficient of Ta:distribution coefficient of Nb whereby the distribution coefficient is concentration in the organic phase:concentration in the aqueous raffinate. The total extraction indicates the percentage of the $Ta_2O_5+Nb_2O_5$ that was extracted into the organic phase based on the content of the initial solution.

The aqueous and the organic phases obtained by the extraction were analyzed. For this purpose ammonium hydroxide was added to the solutions (after addition of acetone to facilitate filtration) whereby tantalum and niobium were precipitated as the hydroxides; these were then removed by filtration and calcined at 800° C. for at least 2 hours. X-ray fluorescence analysis was applied to mixtures which contained not less than 2% of either ingredient, while spectographic analysis was used for mixtures that contained less than 2% of either niobium or tantalum.

phenyl diethanolamine was used as the amine and diethyl ketone as the solvent (experiment 24).

Some experiments were carried out (not shown in the table) in which equal volumes of solvent and initial solution were contacted instead of two volumes of solvent per one volume of initial solution. It was found that by the use of a smaller relative quantity of solvent a lower total extraction and a lower separation factor were obtained.

Another example will now be given in which a 15-stage extraction run was carried out; 10 ml. of a feed solution, 5 ml. of scrub solution, and 30 ml. of solvent were contacted in each cycle. The solvent was introduced at the first stage, the feed at the ninth stage and the scrub solution at the fifteenth stage; a countercurrent flow was obained by this. The solvent was diethyl ketone, the feed solution a hydrofluoric acid solution containing 260 g. of tantalum pentoxide plus niobium pent-

| Exp't No. | Amine | pH | Solvent | Total Extraction, Percent | Ta/Nb Separation Factor |
|---|---|---|---|---|---|
| 1 | diethanolamine | 5 | diethyl ketone | 1.0 | not determined. |
| 2 | do | 5 | 12.5% BPA[2]+87.5% diethyl ketone. | 90.0 | 21.9. |
| 3 | do | 7 | diethyl ketone | 0.33 | not determined. |
| 4 | do | 7 | 50% BPA[2]+50% diethyl ketone. | 82.3 | 1.28. |
| 5 | do | 7 | 5% BPA[2]+95% diethyl ketone. | 18.0 | 1.41. |
| 6 | do | 9 | do | 0.72 | not determined. |
| 7 | monoethanolamine | 5 | do | 55.0 | 5.62. |
| 8 | triethanolamine | 5 | do | 50.2 | 6.68. |
| 9 | diethylethanolamine | 5 | do | 57.8 | 7.97. |
| 10 | aminoethylethanolamine | 5 | do | 53.4 | 2.82. |
| 11 | 3-aminopropanol | 5 | do | 53.0 | 11.8. |
| 12 | do | 5 | 12.5% BPA[2]+87.5% diethyl ketone. | 91.7 | 18.3. |
| 13 | aniline | 5 | 5% BPA[2]+95% diethyl ketone. | 60.8 | 321. |
| 14 | 50% b. vol. of aniline+50% monoethanolamine. | 5 | do | 55.6 | 200. |
| 15 | phenylethylethanolamine | 5 | do | 63.9 | 268. |
| 16 | do | 5 | diethyl ketone | 38.8 | 506. |
| 17 | do[1] | 5 | do | 34.0 | 128. |
| 18 | do[1] | 5 | cyclohexanone | 59.0 | 19.3. |
| 19 | do[1] | 5 | isophorone | 46.8 | 65.8. |
| 20 | do[1] | 5 | mesityl oxide | 40.2 | 76.5. |
| 21 | do[1] | 5 | tributyl phosphate | 49.1 | 61.0. |
| 22 | m-tolyldiethanolamine | 4 | diethyl ketone | 40.6 | 358. |
| 23 | phenyl diethanolamine | 4 | cyclohexanone | 47.4 | 103. |
| 24 | do | 4 | diethyl ketone | 35.0 | 657. |
| 25 | do | 4 | ethyl acetoacetate | 41.7 | 105. |
| 26 | do | 4 | isophorone | 43.2 | 219. |
| 27 | do | 4 | mesityl oxide | 38.9 | 286. |
| 28 | do | 4 | methyl isobutyl ketone | 30.8 | 281. |
| 29 | do[1] | 4 | diethyl ketone | 36.4 | 152. |
| 30 | do[1] | 4 | isophorone | 52.5 | 97.8. |
| 31 | do[1] | 4 | mesityl oxide | 43.7 | 97.2. |
| 32 | do[1] | 4 | tributyl phosphate | 48.8 | 70.8. |

[1] Indicates that undiluted stock solution was used for these experiments.
[2] BPA indicates a mixture of primary aliphatic amines with highly branched alkyl chains, in which the primary amino-nitrogen is directly attached to a tertiary carbon atom: the mixture principally contained amines from $C_{12}H_{25}NH_2$ to $C_{15}H_{31}NH_2$, had a molecular weight of 185-227, a specific gravity of 0.812, a flash point of 96° C., a boiling range (at 760 mm.) for 5-90% at 223 to 240° C., a neutral equivalent of 191, a refractive index of 1,423 at 25° C., color 1 of the Varnish Scale and was insoluble in water.

The results of the experiments show that under identical conditions aromatic amines and aniline yield considerably higher separation factors than the aliphatic amines. The experiments also demonstrate that the pH values of 7 and 9 are too high and give very low separation factors and in some cases even low total extraction. It is furthermore obvious that the diluted initial solution yielded better separation factors than the extractions carried out from undiluted stock solution. (Compare for instance experiments 16 and 17; experiments 27 and 31; experiments 24 and 29.) The total extraction values did not vary radically with different solvents but the separation factors differed drastically. With aromatic amines the solvent yielding the best separation factors was diethyl ketone (experiments 16, 22 and 24). The very highest separation factor of 657 was obtained when oxide (52:48) per liter, phenyl diethanolamine, and having a pH value of 5; the scrub solution was prepared from an about 0.5 M hydrofluoric acid by adding phenyl diethanolamine thereto until the pH value was approximately 4. The organic phase obtained after the 15 stages contained about 52% of the total oxides, and these 52% were practically pure tantalum pentoxide; its niobium content was 190 p. p. m. This shows that practically 100% of the tantalum oxide had been extracted. The aqueous raffinate contained practically all of the niobium pentoxide and less than 300 p. p. m. of tantalum.

The process is also effective for the separation of titanium values from tantalum values since titanium like niobium stays in the aqueous solution.

Instead of using hydrofluoric acid, columbite-tantalite or similar ores have also been dissolved in an aqueous solution of potassium hydroxide. Also in this instance the ore was first leached with sodium hydroxide and nitric acid as described above; the residue was then treated with a potassium hydroxide solution, e. g. of a concentration of 2 M. A solution was obtained thereby in one instance which had a pH value of above 14 and which contained 65 g. of pentoxides per liter (1.63 M). This type of solution was contacted with various solvents, such as ketones, alcohols, amines, ethers, esters, hydrocarbons and organic phosphates in an attempt to extract the niobium and/or tantalum; but no extraction took place. However, when this solution obtained with the potassium hydroxide was neutralized with citric acid to a pH value below 7 prior to extraction, some extraction occurred. For instance, 20 ml. of the above basic solution were neutralized with 7g. of citric acid to a pH of 4.0 and then extracted with an equal volume of a mixture containing 75% by volume of methyl ethyl ketone and 25% by volume of a mixture of branched primary amines which had a similar tertiary alkyl structure as that used for some experiments summarized in the table but principally from 18 to 24 carbon atoms per molecule, a molecular weight between 269 and 353, a neutral equivalent of 343, a boiling range of 262–315° C. for 5 to 70%, a specific gravity of 0.845, a refractive index at 25° C. of 1.460, color 15 of the Varnish Scale and a flash point of 127° C. A total of 9.4% of the pentoxides was extracted; 44% of these oxides was tantalum oxide. In the remaining aqueous solution 55% of the total oxides were tantalum oxide. The tantalum-niobium separation factor was 1.58.

It will be understood that the process of this invention is applicable to ores other than those mentioned in the introduction and to various kinds of solutions which contain niobium and tantalum values.

What is claimed is:

1. A process of substantially reducing the corrosive effect of hydrofluoric acid on metal and glass equipment used in the selective extraction of tantalum values from an aqueous hydrofluoric acid solution containing said tantalum values together with niobium values by contacting said solution with an organic substantially water-immiscible solvent selected from the group consisting of cyclohexanone, isophorone, mesityl oxide, methyl isobutyl ketone, methyl n-hexyl carbinol, diethyl ketone, tributyl phosphate, ethyl acetoacetate, m-toluidine and a mixture of diethyl ketone plus primary alkyl amines having branched alkyl chains in which the primary amino-nitrogen is directly attached to a tertiary carbon atom and in which the amines contain from 12 to 24 carbon atoms per molecule, said process comprising the step of adding to said hydrofluoric acid solution, prior to contacting with the solvent, an amine selected from the group consisting of phenylethylethanolamine, m - tolyldiethanolamine, phenyl diethanolamine and aniline in a quantity to adjust the pH value of said hydrofluoric acid solution to between 4 and 6.

2. The process of claim 1 wherein the solvent is diethyl ketone.

3. The process of claim 2 wherein the amine is m-tolyldiethanolamine.

4. The process of claim 2 wherein the amine is phenyl diethanolamine.

5. The process of claim 2 wherein the amine is phenylethylethanolamine.

References Cited in the file of this patent

UNITED STATES PATENTS

| | | |
|---|---|---|
| 1,719,650 | Chamberlain | July 2, 1929 |
| 2,562,571 | Partridge | July 31, 1951 |
| 2,767,047 | Wilhelm et al. | Oct. 16, 1956 |

OTHER REFERENCES

Ellenburg et al.: "Analytical Chemistry," vol. 26, No. 6, June 1954, pp. 1045–1047.

Nathan, in "Chemical Abstracts," vol. 47, col. 6849(i), 1953.

Stevenson et al.: "Analytical Chemistry," vol. 25, No. 10, October 1953, pp. 1517–1519.

Hopkins: "Chemistry of the Rarer Elements," D. C. Heath and Co., N. Y., 1923, pp. 225–226.

Milner et al.: "A. E. R. E. Report," C/R 895, pages 1–9.